United States Patent [19]
Stanley

[11] 3,861,221
[45] Jan. 21, 1975

[54] LINEAR ACTUATOR
[76] Inventor: Richard B. Stanley, 4 Coventry on Duxbury, Rolling Meadows, Ill. 60008
[22] Filed: Sept. 19, 1973
[21] Appl. No.: 398,587

[52] U.S. Cl. .................... 74/25, 74/424.8 R, 74/459
[51] Int. Cl. ............................................ F16h 21/16
[58] Field of Search .......... 74/459, 89.15, 424.8, 25

[56] References Cited
UNITED STATES PATENTS

| | | | |
|---|---|---|---|
| 511,679 | 12/1893 | Buckley | 74/459 |
| 3,004,445 | 10/1961 | Mondon | 74/459 |
| 3,595,094 | 7/1971 | Lemor | 74/459 |
| 3,614,900 | 10/1971 | Wahlmark | 74/459 |

*Primary Examiner*—Wesley S. Ratliff, Jr.
*Attorney, Agent, or Firm*—Beaman & Beaman

[57] ABSTRACT

A linear actuator comprising a threaded shaft member, a linearly movable tubular member in concentric telescoping relation to the shaft member that is free of threading, and a special bearing unit interposed between the shaft and the tubular members which is characterized by unjournaled roller elements encircling the shaft and being threaded to mesh with the shaft member threading in rolling engagement therewith, in which the pitch diameter of the rollers is substantially equal to but different from that of the shaft member, and is of opposite hand, whereby linear movement of the tubular member is proportional to the difference between the pitch diameters, and thread size may be proportioned as desired to carry loads to be transmitted through the device instead of being dependent on lead.

12 Claims, 7 Drawing Figures

LINEAR ACTUATOR

My invention relates to, broadly speaking, a linear actuator, and more particularly, to a device for converting rotary motion to linear motion with high force conversion factors over any desired distance at low speed, and the present application deals with arrangements of the general type described in my U.S. Pat. Nos. 3,572,136 and 3,589,202 and my application Ser. No. 344,198.

Existing mechanical devices presently in general use for converting rotary motion to linear motion fall into one of three basic groups, namely screw and nut devices, which provide reasonable force conversion ratios at low efficiency, ball nut devices which provide high efficiency but with low force conversion ratios, and rack and gear devices which provide low force conversion ratios at low efficiency. So far as I am aware, there was no known mechanical method, prior to my invention, for converting rotary motion to linear motion with both high force conversion ratios and high efficiency.

Furthermore, while the common solenoid type device provides low force application at high speed for a short distance using electrical energy, so far as I am aware, there is not in use today any practical method of using electrical energy to provide high force and low speed over a comparatively long distance.

Various devices that have been proposed to meet some of these needs have taken the approach of providing threadless shafts and tubular components in telescoping relation, either concentrically or eccentrically, with one of them being rotatably driven, and interposing between them rolling elements that rotate about axes at an angle to the shaft and achieve the desired linear movement by riding on the rotating component. See, for instance, Uhing U.S. Pat. No. 2,940,322, Pravel U.S. Pat. No. 3,046,800 and Hauptman U.S. Pat. No. 3,081,639.

Other devices proposed include a threaded shaft having flanged or threaded rollers in meshing relation with the shaft in which the rollers are mounted or are arranged in a manner that limits the radial and thrust loads that can be transmitted therethrough. See, for instance, Antila U.S. Pat. No. 3,244,021, Wahlmark Pat. No. 2,525,326, Martins U.S. Pat. No. 3,003,362, and Eastman U.S. Pat. No. 3,128,634.

Screw and nut devices, incidentally, have definite force transmitting limitations since as lead is reduced to increase force conversion factors of the unit, the threading size also is reduced, which means that the higher forces that are transmitted through the device must be resisted by lesser areas of part contact.

A principal object of my invention is to provide a linear actuator of simplified form that provides high force conversion ratios with high efficiency and low speed for force applications over any desired distance, which is adapted to permit the use of electrical energy as its prime mover.

A further principal object of the invention is to provide a linear actuator in which the purchase that the motion converting components make with respect to the rotary and linearly moving elements increases, up to reasonable limits, as the load increases, making it possible to take full advantage of the force conversion ratios that are available.

Still a further object of the invention is to provide an inexpensive bearing unit that, while being no larger and less complicated than conventional shaft journaling bearing units, forms the heart of the mechanism for utilizing a rotating shaft to move a tube received thereover linearly, or vice versa, and which, by adding duplicates of such unit to the shaft, will provide such output force acting linearly as may be desired.

Yet another object of the invention is to provide a linear actuator of the type involving threaded rollers cooperating with a threaded rotatable shaft to linearly move an encompassing tubular member, in which the threading size is not limited or dictated by the lead desired, so that the threading size may be beefed up as desired to handle the forces to be transmitted through the device.

In accordance with this invention, a linear actuator of wide basic utility is provided by employing a shaft member, a tubular member telescopingly receiving the shaft member, and a special bearing unit interposed between the shaft and tubular members, in which the shaft member is threaded, the tubular member is freed of internal threading insofar as the motion translating function of the device is concerned, and the bearing unit comprises a plurality of threaded non-driving roller elements having their threading proportioned for meshing engagement with the threading of the shaft member, with the threadings of both having identical helical angles. The pitch diameter of the roller threading is substantially equal to but different from that of the shaft member, and in the preferred form, is of opposite hand compared to that of the shaft member, with the result that the linear movement or lead of the tubular member is equal to the difference (or net helical angle) between the helical angles of the shaft and roller threading. As this result is conveniently obtained by varying the pitch diameters of the rollers and shaft member, as by making the pitch diameter of the rollers less or greater than the pitch diameter of the shaft, the linear movement or net lead of the tubular member that results is thus proportional to such pitch diameter difference.

The rollers operate within retainer rings to maintain them in spaced relation about the shaft member, and the rollers are operably connected in motion transmitting and force transmitting relation to the tubular member by a pair of thrust rings at either end of the assembled set of rollers which have rolling tongue and groove or thread type interconnection with the individual rollers and bear against suitable abutment means carried by the tubular member, such as lock rings operably mounted about the inner surface of the tubular member. The thrust rings are circular in nature, with the rollers rolling about them in performing their motion translating functions.

Assuming the shaft member is the driving component, the rollers are revolved about the shaft member by their tractional engagement therewith, with the result that the bearing unit advances lengthwise of the shaft member a lead that is commensurate with the net helical angle of the threading of the rollers and screw member, with the resulting movement of the bearing unit axially of the shaft member being transmitted to the tubular member through the thrust ring that is at the leading end of the bearing unit. Since the net helical angle defines the pitch of the bearing assembly, and pitch is inversely proportional to the force conversion factors of the unit (in accordance with the applicable laws of mechanics), it will be seen that as said net helical angle approaches zero the force conversion factors involved approach infinity, making large force output capabilities theoretically available.

In accordance with this invention, the required purchase between the shaft member and the rollers, that is necessary to take advantage of the high force conversion factors that the device is capable of, is maintained since the desired pitch may be obtained without reduction in thread size, contrary to conventional screw and nut linear actuator devices. Furthermore, as the shaft member is the driving component (when it is driven), and the rollers roll roller bearing style about the periphery of the shaft in tractional cooperation therewith, maximum force conversion factors are available based on pitch diameter ratios of the parts in rolling relation.

Moreover, forces are transmitted through the bearing unit rollers by the interaction of the roller threading with the shaft threading and by the tongue and groove interconnection between the roller shanks and the thrust rings. This is to be distinguished from devices such as that shown in the Eastman patent, in which the threaded rollers are journaled at their ends in relatively small bearings that greatly limit force transmitting capability.

Further in accordance with this invention either the shaft member or the bearing unit can be the driving member, preferably using a suitable conventional electric motor as the prime mover. The drive is performed through the rolling frictional engagement of the bearing parts involved, which is generated by the resistance encountered, the arrangement being such that the greater the load to be handled, the greater friction there is available to handle it.

As an example of the possibilities involved, the threading of the shaft and rollers may be formed to provide any desired force conversion factor, such as for instance 1,000 or 2,000 to 1, and the tubular member can be of such length, as necessary, to provide linear movement of the tubular member at high force over the desired distance. As only rolling friction is involved in the motion converting bearing unit and its relation to the threaded shaft member, and only a minimal amount of sliding friction is involved in the cooperation of the bearing unit and the member actuated by it, efficiency is on the order of 70-75 per cent. The bearing unit involved is no larger than conventional ball bearing units for journaling shafts, and where high force outputs are desired, the roller lengths are extended, and/or the bearing units are duplicated on the shaft, as needed to meet requirements. For achieving maximum thrust through the bearing unit, the number of thrust rings employed should equal the number of thread ridges engaged by the rollers.

Other objects of the invention are to provide a linear actuator type of force transmitting device that operates with efficiencies in the range of 70 to 75 per cent, to provide a force transmitting device that provides the above indicated advantages while having one-third the weight and occupying one-third the space of comparable devices, and to provide a linear actuator arrangement and bearing unit therefor that are economical of manufacture, convenient to use, and capable of wide application in industry whereever linear movement of one element with respect to another is desired.

Still other objects, uses, and advantages will be obvious or become apparent from a consideration of the following detailed description and the application drawings.

However, it is to be distinctly understood that the specific drawing illustrations provided are supplied to comply with the requirements of the Patent Laws, and that the invention is susceptible of other embodiments that will be obvious to those skilled in the art, and which are intended to be covered by the appended claims.

GENERAL DESCRIPTION

Figure 1:
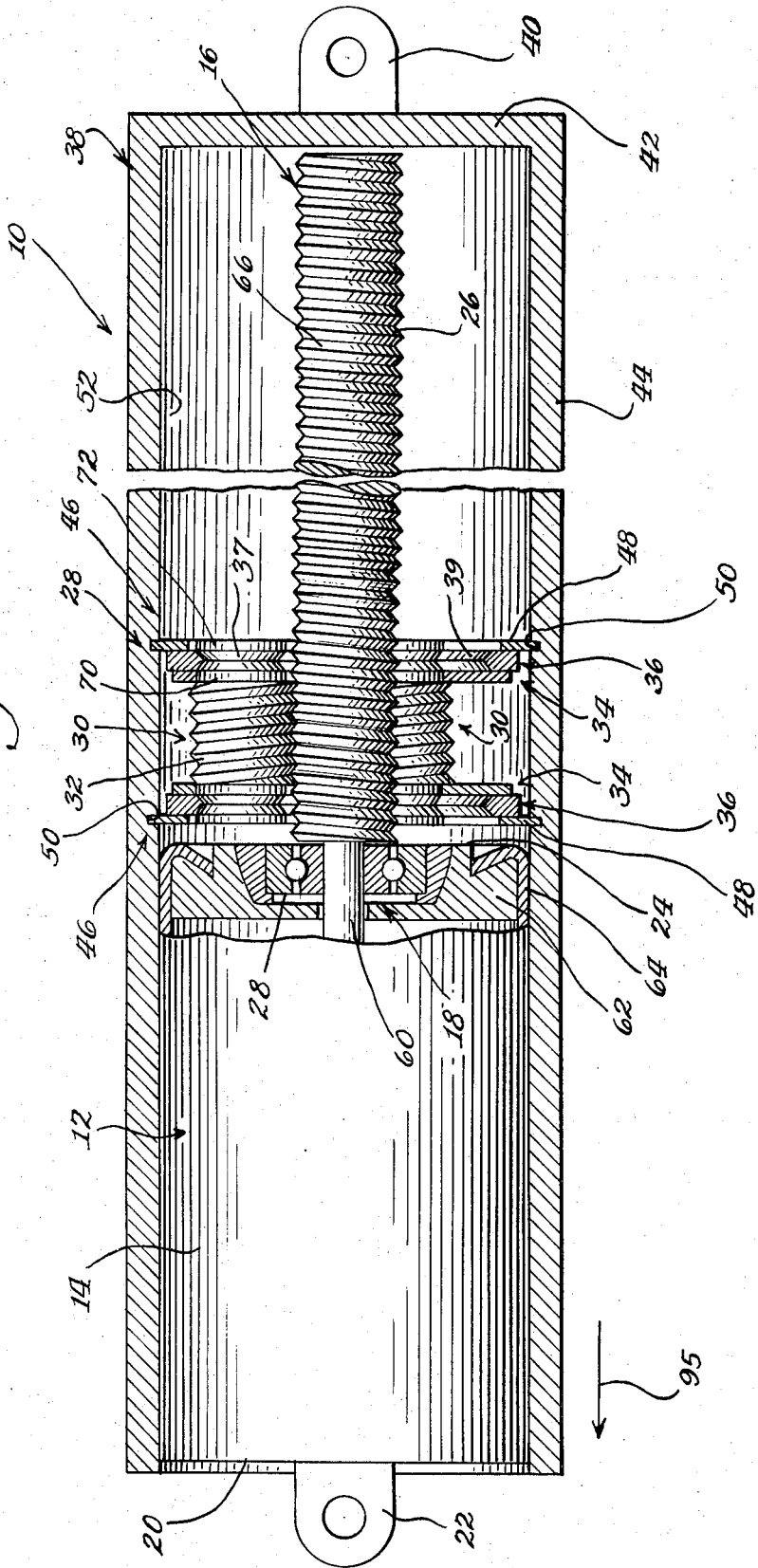
FIG. 1 is a longitudinal sectional view, partially in elevation, illustrating a specific linear actuator device arranged for commercial application and embodying the principles of the present invention.

Reference numeral 10 of FIG. 1 generally indicates a linear actuator device arranged in accordance with the present invention for practical application to any situation where one element or component is to be linearly moved with respect to another as, for instance, opening and closing a door or raising and lowering an automobile window.

The device 10 generally comprises a motor 12 having a housing 14 in which is mounted the usual motor components (not shown) that drive a shaft 16 that is suitably journaled in the housing 14 as at 18. Housing 14 has fixed to one end 20 of same a suitable bracket 22 adapted for connection to one of the structures that the actuator 10 is to be secured between, while the shaft 16 projects from the other end 24 of the motor.

The shaft 16 is formed with external threading 26, and operably associated with the threading 26 is a bearing unit 28 that comprises a plurality of rollers 30 formed with threading 32 that is in meshing relation with the shaft threading 26. The rollers 30 are in tractional rolling relation with the shaft member 16 and are held in spaced apart relation by spacer rings or discs 34, with the spacer rings 34 being disposed at either end of the rollers 30. The rollers 30 at either end of same are in tractional rolling relation with one or more thrust rings or washers 36 that are to transmit to the component to be linearly moved by the bearing unit 30 the linear movement and thrust forces imparted to same by rotation of shaft 16. In the form of the invention shown in FIGS. 1 - 4, it is a tubular member 38 that is linearly moved, which member 38 is received over the shaft 16 and motor housing 14, in substantial concentric relation thereto, and has suitable bracket 40 affixed to its end wall 42 for application to the other component that device 10 is secured between. Also, in the simplified form of FIGS. 1 – 4, a single thrust ring or washer 36 is employed at each end of the rollers.

The tubular member 38 defines a cylindrical side wall 44 that is free of internal threading, and is proportioned to be in substantial complementary sliding relation to the housing 14 of motor 12, whereby the tubular member 38 is guided for rectilinear movement longitudinally of the shaft member 16.

The bearing unit 30 is thus received within the tubular member 38, and between a pair of spaced apart abutments 46, which are illustrated in the form of conventional lock rings 48 suitably received in suitable grooves 50 formed in the internal surface 52 of tubular member 38, whereby the lock rings 48 are keyed to the tubular member 38.

As indicated in FIG. 1, the bearing unit is proportioned lengthwise of the device 10 such that the thrust rings 36 are in substantial abutting relation with the respective lock rings 48 to thereby key the bearing unit to the tubular member 38 through the respective lock rings 48. Rollers 30 are keyed in linear motion transmitting relation to the respective thrust rings 36, as by the respective rings defining an annular inner marginal ridge 39 that is in interfitting relation with the individual roller V-grooves 37 that are formed adjacent each end of the respective rollers 30. Rollers 30 are in rolling relation with the respective ridges 39, which thus form a raceway for the rollers, and rings 36 are proportioned radially to be free floating radially of shaft 16. The tongue and groove connection between the thrust rings and the individual rollers is comparable to the interconnection that the shaft and roller threading 26 and 32 has.

Further in accordance with this invention, the threading 26 and 32 of the shaft 16 and rollers 30 is of substantially equal but different pitch diameters, and of equal but opposite helical or lead angles. Thus the threadings 26 and 32 are of opposite hand (in the preferred form). The pitch of the threadings 26 and 32 may be selected as desired to transmit through the bearing unit 30 to the tubular member 38 the forces desired by the force conversion factor selected.

If the threadings 26 and 32 were made of equal pitch diameters, rotation of shaft 16 by motor 12 would result in zero linear movement of the bearing unit, and thus the tubular member 38 would not move longitudinally of the shaft member 16 (on rotation of shaft 16), and the roller elements 30 would merely revolve through their tractional engagement with the shaft member and thrust rings 36 as long as the shaft member continued to rotate.

However, if, for instance, the pitch diameter of the rollers is made slightly less or greater than the pitch diameter of the shaft, a net helical angle results which dictates the lead of the device, and on rotation of the shaft member 16, the bearing unit 28, and consequently the tubular member 38 moves axially of the shaft 16. The direction of movement will depend on whether the pitch diameter of the roller is less or greater than the pitch diameter of the shaft. Reversal of direction of movement is obtained by reversing the direction of rotation of the shaft member 16. As shaft member 16 rotates, the rollers in rolling about the shaft rotate as a unit, carrying with them spacer rings 34, with the rollers thus planetating or orbiting about the shaft member 16. Bearing rings 36 do not rotate under load, but the rollers roll about them. Rings 34 merely serve as spacers and do not have load transmitting functions.

It will thus be seen that the present invention has a number of important aspects.

For instance, the lead that is obtained by the practice of the invention is no longer a function of thread size, contrary to the usual type of screw and nut device, since the lead is obtained by providing for a net helical angle between the threading of the shaft and rollers, as by varying their pitch diameters from equality (other threading factors being equal). However, the basic functioning of the device is still based on the fundamental principle that lead is inversely proportional to the force conversion factors of the unit, and thus it will be seen that quite large force conversion factors can be built into the device while retaining standard thread size. For instance, force conversion factors 2,000 or more to 1 are now practical, meaning that for each pound of thrust applied to the shaft 16, 2,000 or more pounds of output force is applied to the tubular member. The amount of difference used between the pitch diameters of the rollers 30 and shaft 16 will depend on the net lead or force conversion factor desired. Of course, the rollers 30 should all have the same pitch diameter, and the pitch diameter of the rollers would ordinarily be varied relative to that of the shaft.

Furthermore, the force transmitting capability of the rollers is not limited by any encircling journaling bearings at the roller ends, as is true in conventional screw and nut devices employing one or more threaded rollers in threaded engagement with the shaft. It is to be noted that the rollers 30 are merely retained in spaced apart relation, and free roll on the shaft threading 26 as well as on the thrust members 36, with the rollers 30 being in load transmitting relation with the shaft through the intermeshing threadings 26 and 32, and with the rollers 30 being in load transmitting relation with the load transmitting ring members 36 by the tractional interfitting relation of the roller grooves 37 and the thrust ring ridges 39. In this connection maximum load transmittal through the bearing unit is achieved by having the number of thrust rings 36 that cooperate with rollers 30 be the same as the number of roller thread turns that are intermeshed with the shaft threading. This is shown in the bearing unit 28A of FIG. 5 in which six thread turns of the rollers 30A engage the shaft threading 26 and there are three thrust rings 36 at the respective ends of the rollers 30A in force transmitting relation thereto. The rollers 30A are made longer than rollers 30 for formation therein of the multiple grooves 37 at their ends for cooperation with the ridges 39 of the respective thrust rings 36. The bearing unit 28A is otherwise the same as unit 28, as indicated by corresponding reference numerals.

Figure 2:
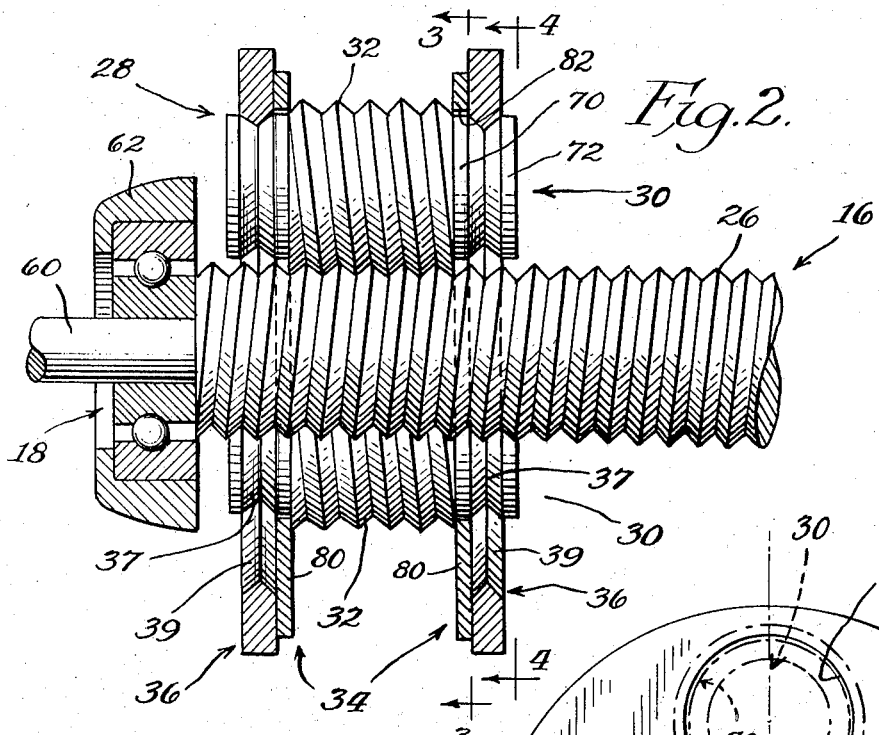
FIG. 2 is an elevational view, partially in section, of the principal motion translating components of the invention, illustrating same as shown in FIG. 1, but on an enlarged scale.
Figure 3:
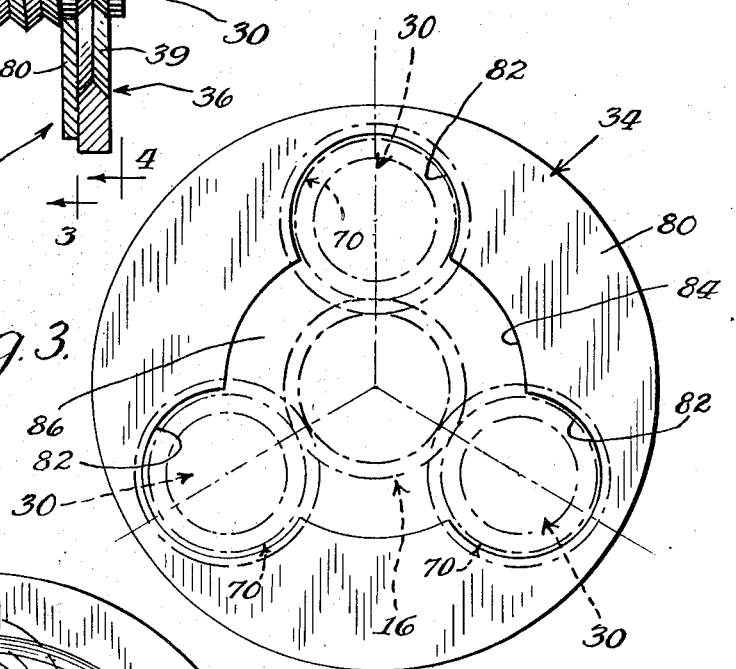
FIG. 3 is an elevational view of one of the roller spacer rings employed in connection with the invention, and viewed along line 3—3 of FIG. 2 with the rollers shown in phantom.
Figure 4:
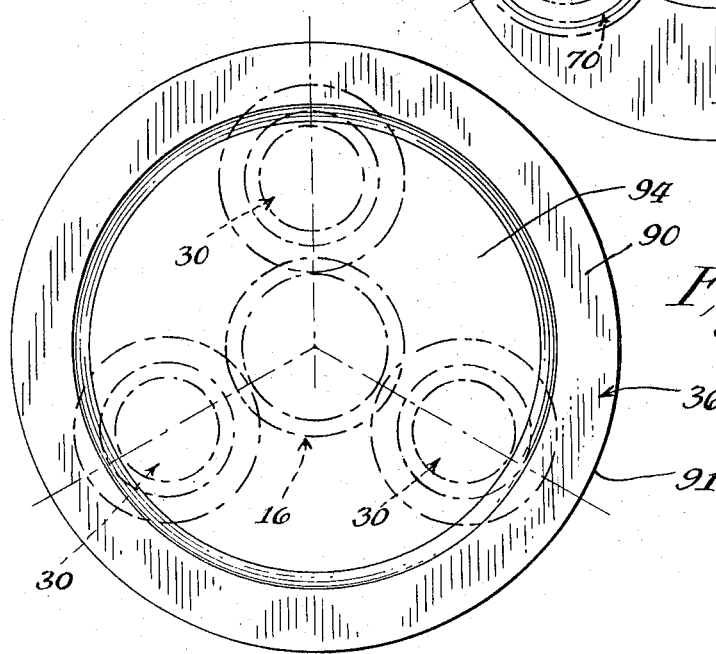
FIG. 4 is a view similar to that of FIG. 3 but illustrating one of the thrust rings employed in connection with the invention.

The form of FIGS. 1 and 2 may be utilized where loads to be imposed will be well under the force transmitting capability of the rollers 30 if fully equipped with the necessary load balancing thrust rings, as aforedescribed.

Load resisting capacity of the device can be increased by merely increasing the lengths of the rollers 30 (assuming the spacing apart of key rings 48 is increased accordingly), or adding additional bearing units 28, or both.

It is also an important aspect of the invention that the rollers 30, of the bearing unit of which they are a part, are of identical shape and construction and may be used interchangeably. Except for the spacing restraint on the rollers 30 that is exercised by the spacer rings 34, rollers 30 are essentially free rolling in nature, and aside from the retainer friction involved in the operation of the spacer rings 34, the rollers 30 operate under rolling friction conditions, which makes possible efficiencies on the order of 70 to 75 per cent or more.

A further important aspect of the invention is that, in the forms of FIGS. 1 – 5, the rollers are not the driving agency for linearly moving the tubular member, but rather the shaft is the driving agency, with the rollers rolling roller bearing style on the shaft but in threaded connection therewith. This makes for full use of the pitch diameter relationships between the parts that will provide maximum force conversion results.

In the bearing unit 28B of FIG. 6, the threadings 26 and 32B of the shaft and rollers respectively are of the same hand, with the pitch diameters of same being varied as described in connection with the forms of FIGS. 1 – 5. The relation of the threadings of bearing unit 28B provides rapid movement of the tubular member 38, which may be increased or decreased by varying the pitch diameters of the shaft 26 and rollers 32B from equality.

Figure 7:
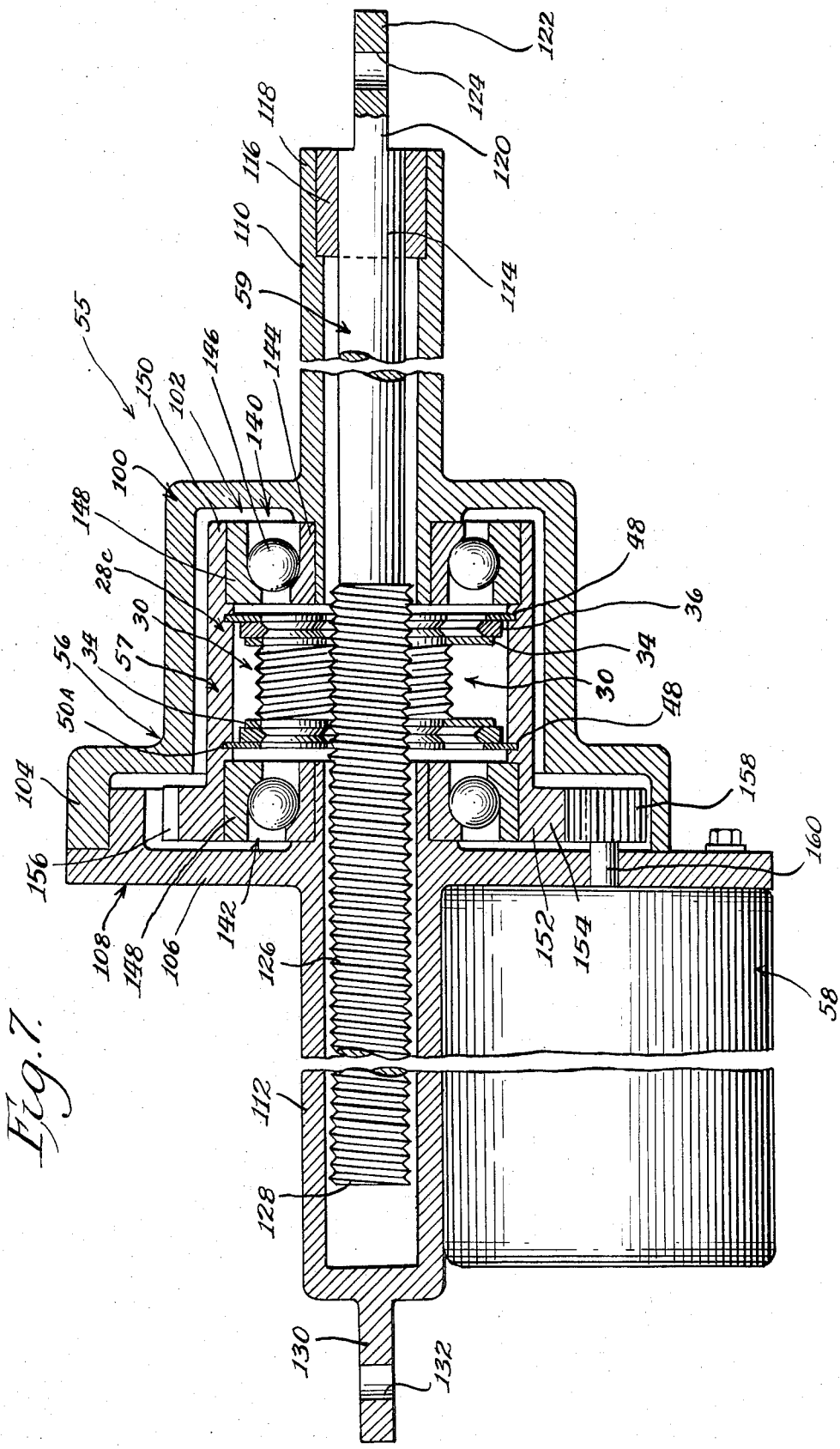
FIG. 7 is a view similar to that of FIG. 1 illustrating a further modified form of the invention.

FIG. 7 illustrates a linear actuator 55 in which the bearing unit 28C is journaled in suitable housing 56 and includes tubular member 57 that is rotated by motor 58 to linearly move shaft 59 by engagement therewith of rollers 30 employed in bearing unit 28C.

SPECIFIC DESCRIPTION

Referring back to the embodiment of FIGS. 1 - 4, the motor 12 may be of any suitable type that is reversibly driven. In the form shown, the shaft member 16 has a shank portion 60 which is operably connected to the driven component of the motor and is journaled by suitable bearing unit 18 in the wall 62 of the motor, in any suitable manner. Housing 14 is in the form of casing 64 that operably mounts the motor wall 62 and the other usual motor components making up the motor 12, all in any conventional manner.

The shaft threading 26, which is formed on the threaded portion 66 of the shaft member 16, may be of any standard external or male type, standard V type threads being illustrated and preferred. The pitch of the threading 26 (the distance between like points of the threading) is optional but the threading should be of the single thread or lead type. Of course, the shaft 16 should be formed from a good grade of steel suitably hardened and ground to the shaping indicated.

The rollers 30 are preferably formed from a suitable bearing steel and are suitably hardened and ground to the shape indicated, with threading of the same type used on the shaft 16 being employed. Each roller comprises a shank 70 having cylindrical end portions 72 in which the respective V grooves 37 are formed.

It is to be noted that the end portions 72 of the roller elements are free of circumferentially extensive or confining journaling. The rollers 30 are retained in their operative relation with the shaft by their application to retainer rings 34 and their rolling engagement with the thrust rings 36, with the rollers 30 being in keyed relation with thrust rings 36 by virtue of the interfitting relation of the ridges 39 and roller grooves 37. This keying relation is quite comparable to that between threadings 26 and 32, except grooves 37 and ridges 39 are in right angled relation to the rollers 30 rather than being helical. In this connection the grooves and ridges 37 and 39 may be reversed in location if desired; thus the grooves 37 may be formed in the thrust rings and the ridges 39 formed in the rollers.

Retainer rings 34 each comprise a ring element 80 (see FIG. 3) of annular configuration shaped to define spaced apart recesses 82 which are equal in number to the numbers 30 employed, and each of which receives one end 72 of a roller 30 for retaining, without journaling, the rollers in spaced relation. Inner marginal portion 84, struck about the axial center of the retainer ring 34, spans the distance between adjacent recesses 82, and defines, with the recesses 82, a center opening 86 through which the shaft 16 extends. Rings 34 are received between the thrust rings or washers 36 and the threading adjacent same at the ends 72 of the respective rollers.

The force transmitting rings 36 are of washer like configuration and thus define ring like body 90 (see FIG. 4) having a marginal rim 91 that preferably is somewhat less in diameter than the internal diameter of tubular member 38 so that thrust members 36 may float radially of the tubular member to provide a self adjusting action as it is required by circumstances. The bore 94 of the thrust members 36 is defined by the radially extending ridge 39 which, as indicated in FIGS. 1 and 2, is of V cross-sectional configuration that complements the V configuration of the grooves 37 of the rollers 30. The V configuration of groove 37 is the same in transverse section as that of the threading 32.

The rings 34 and 36 may be formed from a suitable steel or the like. I contemplate that rings 36 may be suitably spring loaded to slip relative to lock rings 48 at the end of the stroke of the device.

Lock rings 48 may be of any suitable type of conventional lock ring suitably proportioned for the purpose intended.

It is to be also noted that the drive for rollers 30 is through tractional threaded engagement with the centrally located shaft 16, as distinguished from prior art type roller drives, of the type represented by the Eastman patent, wherein the drive for the rollers is through end bearings at the ends of the rollers, and is strictly limited by the inability of such end bearings to resist significant loads. Also the loads are transmitted by the rollers 30 to the thrust rings 36 by the shear type interfitting relation there involved, which may be increased in area as desired by adding the required number of thrust rings up to the number of roller thread turns in engagement with the shaft threading.

In one specific embodiment of the invention employing the arrangement of FIGS. 1 – 4, the motor 12 is a Barber-Coleman type FYOM motor having a speed of 36,000 rpm with 1.5 ounce inches torque. The pitch diameter of the shaft threaded portion 66 is 0.318 inch (which thus has a circumferential distance of approximately one inch), as compared to a pitch diameter of 0.303 inch for rollers 30, resulting in a net helix angle of 12°, which provides a lead per motor revolution of 0.0035 inch. The pitch of the threads of both the shaft and the rollers is 0.062 inch.

When the motor 12 is operating at its rated speed of 36,000 rpm, tubular member 12 will have a linear speed of 12.6 inches per minute. The force conversion factor involved is approximately 1,800 to 1, and assuming a 70 per cent efficiency for the device, the tubular member will provide 116 pounds of thrust.

As explained hereinbefore, the net helical angle is obtained by making the threading of the shaft member and rollers of substantially equal but different pitch diameters; by decreasing the net helical angle the force conversion factors may be increased to infinity with corresponding decrease in linear speed, and vice versa. Since the size of the threading employed for both the shaft member and the rollers is not effected by any force conversion factor or linear movement rate that may be desired, the purchase that is required to make effective the increased force conversion factors now available through the use of my invention is assured, by utilizing threading of appropriate size to resist the thrust forces involved and the appropriate number of thrust rings relative to the number of roller thread turns in engagement with the shaft threading.

In accordance with this invention, the indicated relationships between the shaft 16, rollers 30, rings 36, and the lock rings 48 provide a thrust bearing arrangement which insures that the purchase that the motion converting components make with respect to the shaft and tubular member increase in effectiveness as the loads increase, and that all the roller elements resist thrust and at the portions of same best suited to do so.

Figure 5:
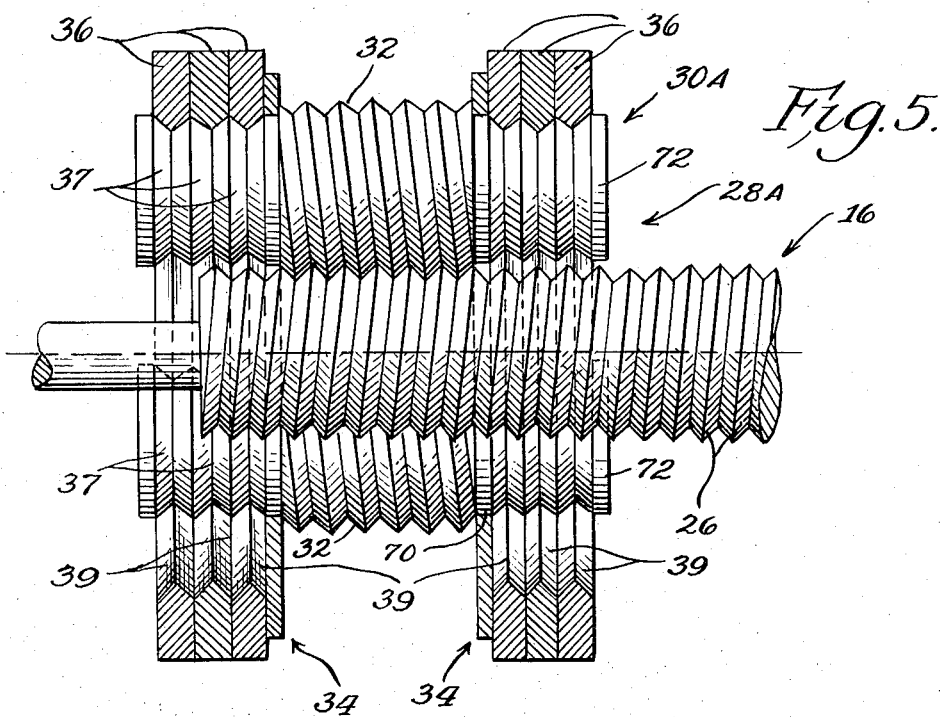
FIG. 5 is a view similar to that of FIG. 2 illustrating the device arranged for maximum thrust through same.

For instance, assuming that a load is acting on the tubular member in the direction 95 (of FIG. 1), and the motor 12 and the parts that it is connected to are held against movement, the force acting in the direction of the arrow 95 is applied to shaft 16 through the shear relation provided by the intermeshing parts of the bearing unit 28 and the thrust rings thereof. As loads are increased, friction forces, through which the rotating shaft acts on the rollers and through which the rollers act on thrust rings 36 (to resist the load), increase. This permits (assuming the principles of FIG. 5 are employed) the transfer through the bearing unit 28 to the tubular member 38 the maximum forces made possible by the force conversion factors involved in the particular net helical angle that is used in the threadings 26 and 32 (either to hold the tubular member 38 against movement, or to move same linearly as desired on operation of motor 12), up to the yield strength of the elements involved. Forces acting in the opposite direction provide a similar result.

Figure 6:
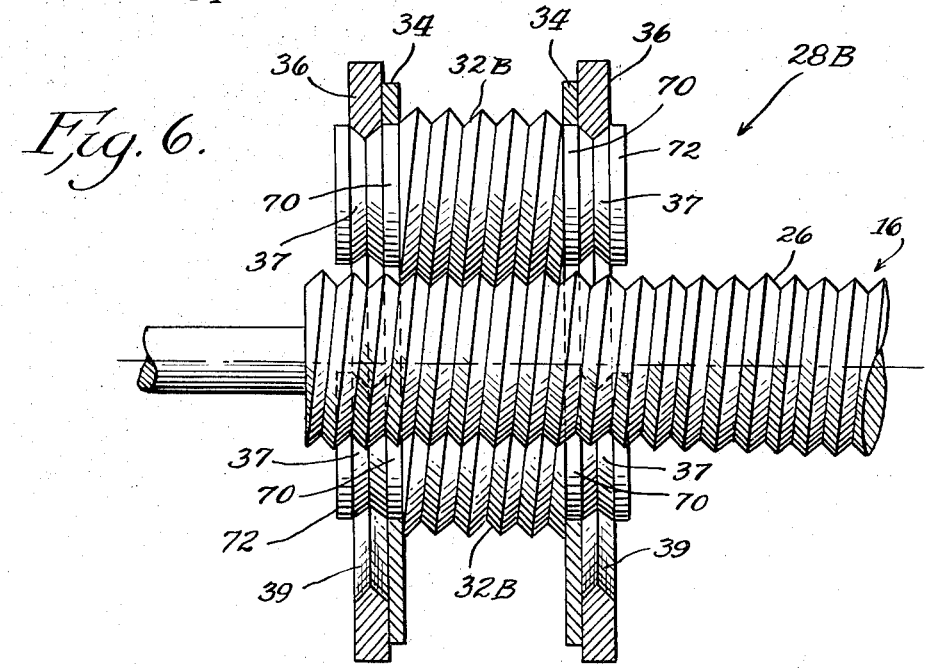
FIG. 6 is a view similar to that of FIG. 2 but illustrating a modified form of the invention.

The rollers, the shaft, the retainer rings, and the thrust rings of the embodiments of FIGS. 5 and 6 may be made in a manner comparable to the corresponding parts of the embodiments of FIGS. 1 – 4, except for the differences that have been noted. In these views, corresponding parts are indicated by identical reference numerals.

In the linear actuator 55 (see FIG. 7), housing 56 generally comprises housing section 100 shaped to define a bearing unit chamber 102 in which bearing unit 28C is disposed. Housing section 100 includes rim portion 104 that is suitably secured to mounting flange 106 of housing section 108, which also suitably mounts motor 58.

The housing sections 100 and 108 are respectively formed with tubular portions 110 and 112 that are in coaxial relation and receive the shaft 59.

Shaft 59 comprises a plain or unthreaded shank portion 114 which is slidably received in suitable bearing sleeve 116 secured in the open end portion 118 of the housing tubular portion 110. The shaft 59 at its end 120 is equipped with a suitable lug structure 122 formed with opening 124 for securement of same to one of the structures that the actuator 55 is to be secured between.

Shaft 59 is formed with threading 126 for cooperation with the bearing unit 28C, with the end 128 of the shaft being received well within the housing tubular portion 122 when the shaft 59 is in its fully retracted relation (the position shown in FIG. 7).

The housing tubular portion 112 is formed with a suitable lug structure 130 shaped with a suitable opening 132 for connection to the other structure that the actuator 55 is to be secured between, whereby one of such structures is moved linerally with respect to the other, depending on which one is fixed against movement.

The bearing unit 28C includes the rollers 30, the retainer rings 34, the thrust rings 36, and the lock rings 48 of the embodiment of FIGS. 1 – 4, with the parts being arranged and shaped in the manner described with reference to FIGS. 1 – 4, and being received within tubular member 57 in the manner indicated in the drawing, lock rings 48 being received in the respective recesses 50A that are formed in the tubular member 57. The tubular member 57 is journaled on suitable thrust bearing units 140 and 142, each of which comprises an inner race 144 suitably mounted on the respective housing sections, bearing balls 146, and a suitable outer race 148 suitably mounted and retained with the respective end portions 150 and 152 of the tubular member 57. The tubular member 57 side 152 is flanged as at 154 and formed with gear teeth 156 that cooperate with pinion gear 158 which is keyed to shaft 160 driven by motor 58.

The relation between the pitch diameters of the rollers 30 and the shaft 59, and the threading of these components, is the same as described in connection with the embodiment of FIGS. 1 – 4, whereby the threading of rollers 30 and the shaft 59 is of the same helical angle but of opposite hand, with the pitch diameters being substantially equal but different to the degree desired to obtain the desired net helical angle as has been explained hereinbefore.

Assuming that the housing section 108 is secured to a structure that is fixed against movement and the shaft 59 is secured to a structure to be moved linearly, on operation of the motor 58 to rotate shaft 160, the tubular member 57 is rotated to revolve the bearing unit 28C relative to the shaft 59, with the result that the rolling action of the rollers 30 on the shaft threading 126 moves the shaft 59 inwardly or outwardly of the housing 100, depending on the direction of rotation of the bearing unit 30, and whether or not the pitch diameter of the rollers 30 exceeds or is less than the threading of the shaft 59.

Where the bearing unit is shown in side elevation in the drawings, one of the rollers 30 (the one nearest the observer) is omitted to facilitate illustration.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. In a linear actuator comprising a threaded shaft member, a tubular member in substantial concentric telescoping relation to said shaft member, with one of said members being rotatably mounted and the other of said members being linearly movable, a bearing unit interposed between said members, and means for rotating said one member about its axis of rotation to move said other member linearly,
   said bearing unit comprising:
   a plurality of discrete rollers interposed between said members in circumambient, spaced relation about said shaft member and extending longitudinally thereof,
   said rollers being aligned transversely of the shaft member and being free of engagement with said tubular member,
   said rollers being threaded intermediate the ends thereof and said roller threading and said shaft member threading being of equal pitch,
   said rollers being free of end journaling and intergearing connections at their ends and having their threading in tractional rolling meshing relation with that of said shaft member,
   with the threading of said rollers and said shaft member having similar but different pitch diameters with equal helical angles,
   a pair of rollerway forming rings interposed between said rollers and said tubular member and spaced apart longitudinally of said members,
   said rings being disjunctively related and free of engagement with said tubular member,
   said rings respectively being disposed adjacent the respective ends of said rollers,
   said rings and rollers being in tongue and groove type keying connection engagement adjacent said roller ends,
   with said rollers being in free rolling tractional engagement with said rings at said connections of said rings with said rollers for rolling of said rollers about said rings, whereby on rotation of said one member said rollers each rotate about their respective axes and roll on and about said rings to planetate about said shaft member,
   with said rings and rollers as a unit and said one member having relative linear movement on rotation of said one member in proportion to the difference between said pitch diameters of said shaft member threading and said roller threading,
   and means for keying said rings to said tubular member for effecting linear movement of said other member on said relative linear movement on rotation of said one member.

2. The linear actuator set forth in claim 1, wherein: said threading of said rollers and shaft member is of opposite hand.

3. The linear actuator set forth in claim 1, wherein: said threading of said rollers and shaft member is of the same hand.

4. The linear actuator set forth in claim 1, wherein: said shaft member is said one member and said tubular member is said other member.

5. The linear actuator set forth in claim 1, wherein: said tubular member is said one member and said shaft member is said other member.

6. The linear actuator set forth in claim 1, wherein: said rollers are of identical interchangeable construction.

7. The linear actuator set forth in claim 1, wherein: the pitch diameter of said threading of said rollers is less than the pitch diameter of the threading of said shaft member.

8. The linear actuator set forth in claim 1, wherein: the pitch diameter of said threading of said rollers is greater than the pitch diameter of the threading of said shaft member.

9. The linear actuator set forth in claim 1, wherein said bearing unit includes:
   spacer discs disposed one adjacent either end of said unit and in circumambient relation to said rollers and being formed to maintain said rollers in said spaced relation circumferentially of said shaft member,
   said discs being discrete of said rings and each other.

10. The linear actuator set forth in claim 1, wherein: said keying means comprises abutment means carried by said tubular member within same adjacent either end of said unit between which said rings are interposed in thrust transmitting relation therewith.

11. In a linear actuator of the type including a threaded shaft member, a linearly movable tubular member in substantial concentric telescoping relation to said shaft member, a bearing unit interposed between said members, means for rotating said shaft member, said bearing unit comprising a plurality of rollers interposed between said members in spaced apart relation about said shaft member, with said rollers being threaded intermediate the ends thereof and having their threading in tractional rolling meshing relation with that of said shaft member, the improvement wherein:
    said rollers are discrete and are free of engagement with said tubular member,
    said roller threading and said shaft member threading being of equal pitch,
    said rollers being free of end journaling and intergearing connections at the ends thereof,
    with the threading of said rollers and said shaft member having similar but different pitch diameters with equal helical angles,
    said bearing unit further comprising:
    a pair of rollerway forming rings interposed between said rollers and said tubular member and spaced apart longitudinally of said members,
    said rings being disjunctively related and free of engagement with said tubular member,
    said rings respectively being disposed adjacent the respective ends of said rollers,
    said rings and rollers being in tongue and groove type keying connection engagement adjacent said roller ends,
    with said rollers being in free rolling tractional engagement with said rings at said connections of said rings with said rollers for rolling of said rollers about said rings, whereby on rotation of said shaft member said rollers each rotate about their respective axes and roll on and about said rings to planetate about said shaft member,
    with said rings and rollers having linear movement as a unit with respect to said shaft member on rotation of said shaft member in proportion tp the difference between said pitch diameters of said shaft member threading and said roller threading,
    and means for keying said rings to said tubular member for effecting linear movement of said tubular member by said linear movement of said rollers and rings on rotation of said shaft member.

12. A bearing unit for application between an externally thraded shaft member, and a tubular member in substantial concentric telescoping relation to said shaft member, with one of said members being rotatably mounted and the other member linearly movable, said bearing unit comprising:

a plurality of discrete rollers radially spaced to be interposed in operating position between said members in circumambient spaced relation about said shaft member and oriented to extend longitudinally thereof, said rollers being aligned transversely of the unit, and proportioned to be free of engagement with said tubular member when in said operating position, said rollers being threaded intermediate the ends thereof and said roller threading and said shaft member threading being of equal pitch, said rollers being free of end journaling and intergearing connections at their ends and having their threading in tractional rolling meshing relation with that of said shaft member when in said operating position, with the threading of said rollers and said shaft member having similar but different pitch diameters with equal helical angles, a pair of rollerway forming rings received about said rollers and spaced apart longitudinally of said members, said rings being disjunctively related and being proportioned to be free of engagement with said tubular member in said operation position of said rollers, said rings respectively being disposed adjacent the respective ends of said rollers, said rings and rollers being in tongue and groove type keying connection engagement adjacent said roller ends, with said rollers being in free rolling tractional engagement with said rings at said connections of said rings with said rollers for rolling of said rollers about said rings, whereby when said rollers are in said operating position and on rotation of said one member said rollers each rotate about their respective axes and roll on and about said rings to planetate about said shaft member, and said rings and rollers as a unit and said one member having relative linear movement in proportion to the difference between said pitch diameters of said shaft member threading and said roller threading.

* * * * *